T. F. HANDLY.
FIRE EXTINGUISHER.
APPLICATION FILED MAR. 29, 1906.

954,282.

Patented Apr. 5, 1910.
4 SHEETS—SHEET 1.

Witnesses.
C. Klostermann
J. N. Butler

Inventor.
Thomas F. Handly.
N. C. Everitt Co.
by
Attorneys.

T. F. HANDLY.
FIRE EXTINGUISHER.
APPLICATION FILED MAR. 29, 1906.

954,282.

Patented Apr. 5, 1910.
4 SHEETS—SHEET 3.

Witnesses:
O. Klosterman
R. H. Butler

Inventor.
Thomas F. Handly.
by H. C. Evert & Co.
Attorneys.

UNITED STATES PATENT OFFICE.

THOMAS F. HANDLY, OF ALLEGHENY, PENNSYLVANIA.

FIRE-EXTINGUISHER.

954,282.     Specification of Letters Patent.     Patented Apr. 5, 1910.

Application filed March 29, 1906. Serial No. 308,702.

*To all whom it may concern:*

Be it known that I, THOMAS F. HANDLY, a citizen of the United States of America, residing at Allegheny, in the county of Allegheny and State of Pennsylvania, have invented certain new and useful Improvements in Fire-Extinguishers, of which the following is a specification, reference being had therein to the accompanying drawing.

This invention relates to certain new and useful improvements in fire extinguishers and the invention relates more particularly to that type of apparatus commonly known as a chemical fire extinguisher.

My invention has for its primary object to provide a novel form of cage for supporting bottles of various sizes and contours, said cage being employed to support a bottle of acid within a suitable receptacle containing an alkaline solution, the freeing of the acid causing the same to mingle with the alkaline solution or fluid which will produce a gas having an expelling force sufficient to extinguish a fire.

Another object of the invention is to provide novel means in connection with the cage of an extinguisher for regulating the discharge of acid from a bottle contained within the cage.

Another object of this invention is to provide a novel bottle cage for supporting bottles of various heights and cross-sectional contours.

A further object of the invention is the provision of novel means for preventing the bottles contained within extinguisher cages from cracking or breaking from the heat generated by the commingling of the acid and alkaline solution.

A still further object of this invention is to provide simple and easily manipulated cages for bottles within fire extinguishers.

The present invention involves certain new and useful features of construction which are an improvement upon my improved fire extinguisher an application being filed December 21st, 1905, Serial No. 292,757, wherein I described and illustrated a novel form of cage for chemical fire extinguishers.

With the above and other objects in view, the invention consists in the novel construction, combination and arrangement of parts to be hereinafter more fully described and claimed, and referring to the drawing accompanying this application, like characters of reference designate corresponding parts throughout the several views, in which:—

Fig. 35 is a detail perspective view of the cap or lid of an extinguisher constructed in accordance with my invention.

In the accompanying drawings, I have illustrated a conventional form of fire extinguisher casing 1, said casing having a contracted exteriorly screw threaded neck 2, upon which is adapted to fit a cap or lid 3 carrying a circular handle 4. The handle 4 is supported by radially disposed circular ribs 5 and in connection with these ribs, I have discovered that the circular ribs are of greater convenience in rotating the cap or lid 3 than the ordinary straight rib heretofore used. In removing the cap or lid 3 from the extinguisher 1, it is natural that the most convenient article be used to loosen the lid or cap 3 upon the extinguisher casing, in the majority of instances, a broom handle being employed for this purpose. In providing the circular ribs 5, a broom handle can be inserted through two diametrically opposed ribs to facilitate the rotating of the cap or lid 3. In providing the circular ribs to receive a broom handle, a greater surface of the handle bears upon the ribs 5, thus preventing the ribs from breaking when loosening the cap or head.

Figure 1:
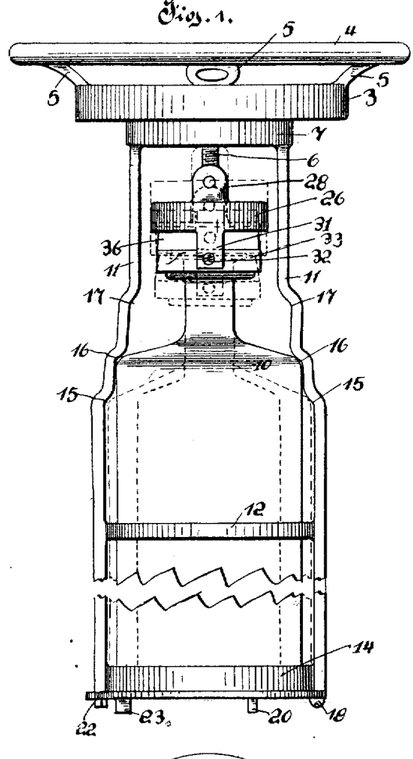
Figure 1 is a side elevation, partly broken away of a fire extinguisher cage constructed in accordance with my invention, the cage being illustrated as connected to the cap or lid of the fire extinguisher casing.
Figure 2:
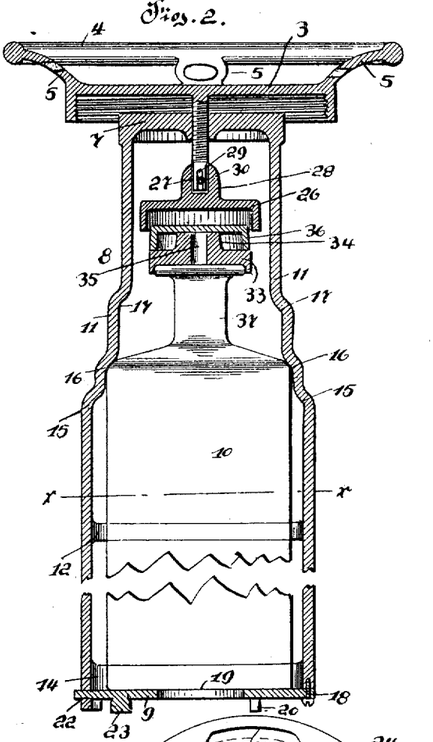
Fig. 2 is a vertical sectional view of the same.

The cap or lid 3 illustrated in Figs. 1 and 2 of the drawings, is provided with a central depending screw threaded stem 6, upon which is mounted the head plate 7 of a bottle cage 8, said cage being provided with a movable base plate 9 adapted to support a bottle or similar receptacle 10 within the cage. A particular feature of my invention resides in the construction of the cage 8, which in its preferable form consists of two diametrically opposed rods or cage arms 11, 11, said rods or cage arms being connected together by circular bands or rings 12 and 14, forming bottle-engaging frames, the band or ring 14 being located at the lower ends of the rods or cage-arms 11, 11. The rods or cage-arms intermediate the head plate 7 and the band or ring 12 are irregularly curved to provide shoulders 15, 15, 16, 16 and 17, 17, the object of which will be presently described.

The movable base plate 9 is pivotally connected at the lower end of one of the rods or cage-arms 11, as at 18, said base plate having a central opening 19 and depending lugs 20, 20, which serve functionally to support the base plate 9 and the cage 8 when resting upon a table or similar support. The base plate opposite its pivoted side is enlarged to form a tooth 21, said tooth being adapted to move into a slot 22 formed in the lower end of one of the rods or cage arms 11. The base plate is provided with a depending handle 23 by which the plate is moved, said handle also serving functionally as a leg when supporting the cage upon a table or like support.

Figures 3, 4, 5:
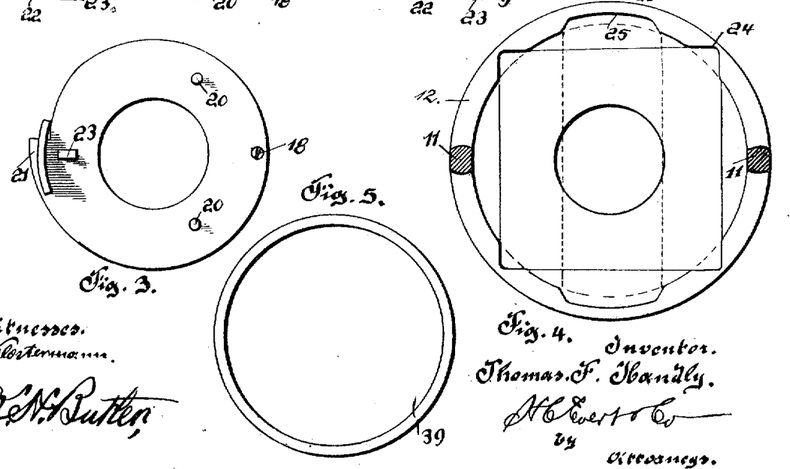
Fig. 3 is a bottom plan of the movable base plate of the extinguisher cage.
Fig. 4 is a cross sectional view taken on the line $x$—$x$ of Fig. 2.
Fig. 5 is a plan of a circular cage.

In providing the rods or cage arms 11, 11 with shoulders 15, 15 to 17, 17 inclusive, I have overcome certain objectionable features of fire extinguishers heretofore used. It has been the practice, of manufacturers of fire extinguishers to provide said extinguishers with a cylindrical eight-ounce bottle containing an acid, said bottle being supported within the cage by a cylindrical casing. As the extinguishers are often used in rural districts, considerable time and expense is incurred when replacing the bottles after they have been broken. Owing to the fact that cylindrical eight-ounce bottles are not always accessible, I have aimed to provide novel means for supporting bottles or receptacles of various sizes and contours within the cage 8. By referring to Figs. 2 and 4 of the drawings, it will be observed that the shoulders 15 to 17 inclusive will engage three different heights of bottles, while the recessing of the band or ring 12, as at 24 and 25 permits of a square, round or oval shaped bottle being supported within my improved cage. To place a bottle within the cage, the base plate 9 is swung to one side to permit of the bottle being inserted upwardly between the rods or cage-arms 11, 11 of the cage, and the base plate is swung to close the bottom of the cage. It is obvious that the band or ring 14 may be constructed similar to the band or ring 12 illustrated in Fig. 4 of the drawings.

An important adjunct of the cage just described is a stopper, which is supported by the bottle or receptacle 10 within the cage 8, I have shown herein, and will describe, several different forms of construction of this stopper, first having reference to the construction of stopper illustrated in Figs. 1 and 2 of the drawings. The lower end of the depending screw threaded stem 6 is contracted to fit within a recess 27 formed in a central enlargement 28 carried by the cap-member 26. The end of the screw threaded stem 6 is also slotted as at 29, and passing through said slot is a pin 30 carried by the central enlargement 28 of the cap-member 26. The cap-member carries diametrically opposed depending arms 31, and secured to the lower ends of said arms by screws 32, 32 is a non-corrosive bottle closure 33, said closure being provided with an upwardly extending tapering enlargement 34 having a central bore 35. Between the closure 33 and the cap-member 26 is mounted an inverted cup 36, said cup acting as a seal and normally closing the central bore 35 of the closure 33. The closure is adapted to fit upon the neck portion 37 of the bottle or receptacle 10 within the cage 8, as clearly illustrated in Figs. 1 and 2 of the drawings. This form of stopper is used in connection with the cage 8, wherein the body portion of the bottle or receptacle 10 is fixed, I having devised another form of stopper, which will be presently described, for cages wherein the sides of the bottle or receptacle 10 are not bound by the rods or cage arms 11, 11, although the construction of stopper shown in Figs. 1 and 2, in some instances can be used upon bottles not bound by the rods or cage-arms 11, 11. In constructing the closure 33, I preferably use lead or a similar non-corrosive metal. As considerable trouble has been experienced in bottles or receptacles breaking or cracking by the heat generated when the acid commingles with the alkaline solution, I employ a lead closure of sufficient thickness which will require considerable time to heat, thereby preventing the neck portion 37 of the bottle from heating or cracking. By the time the lead closure 33 could become heated by the chemical action of the ingredients of the fire extinguisher the solution and ingredients would be exhausted.

Figures 6, 7, 8, 9, 10, 11, 12, 13, 14, 15, 16, 17, 18:
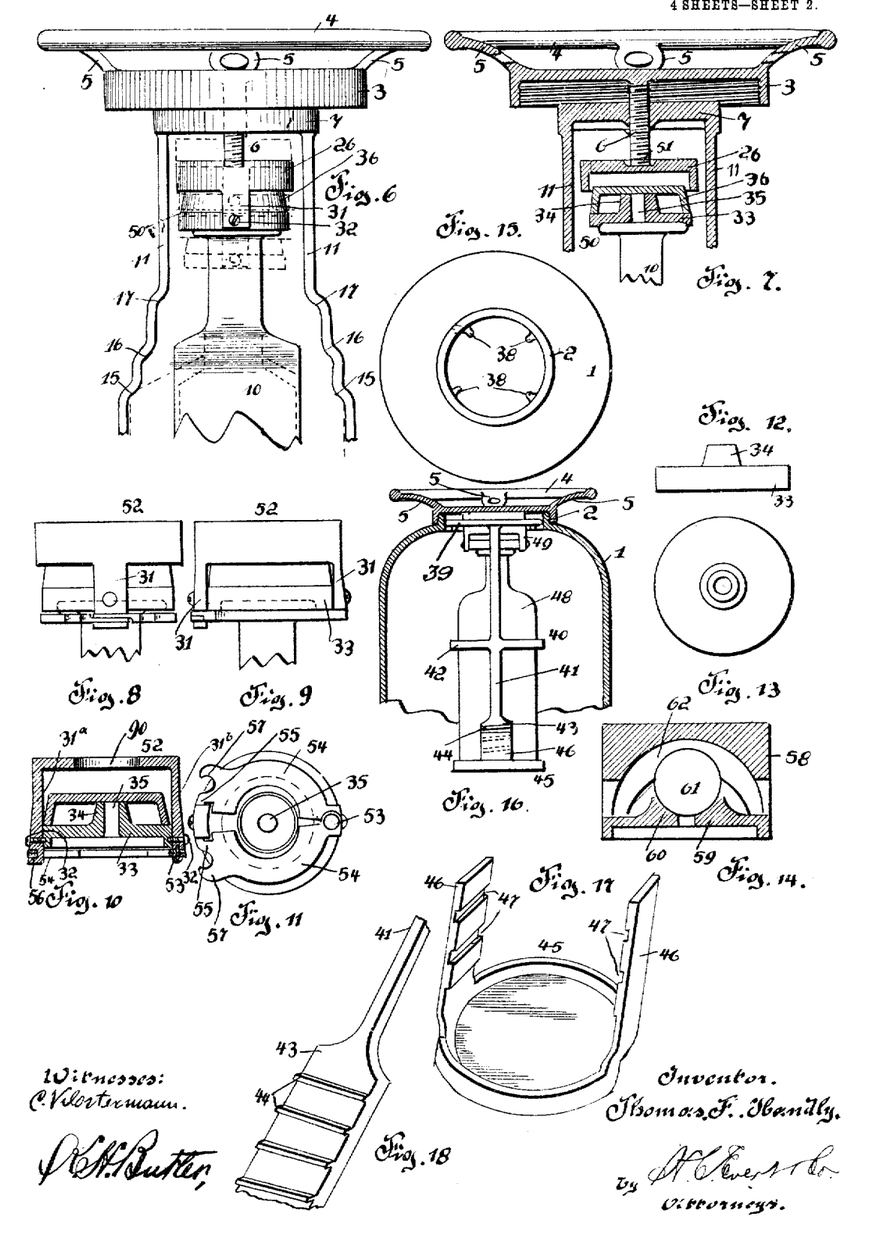
Fig. 6 is a fragmentary side elevation of a cage illustrating a slight modification.
Fig. 7 is a vertical sectional view of the same.
Fig. 8 is a side elevation of a novel form of stopper used in connection with the bottle or receptacle supported in my improved cage.
Fig. 9 is a front elevation of the same.
Fig. 10 is a vertical sectional view of the stopper.
Fig. 11 is a bottom plan thereof.
Fig. 12 is a side elevation of a portion of the cap.
Fig. 13 is a plan of the same.
Fig. 14 is a vertical sectional view of another form of stopper.
Fig. 15 is a plan of an extinguisher casing constructed to support one of my improved cages.
Fig. 16 is a vertical sectional view of the same illustrating a cage and bottle supported therein.
Fig. 17 is a detached perspective view of the base plate of one of my improved cages illustrating a slight modification.
Fig. 18 is a fragmentary perspective view of one of the side arms of the cage.

A modification of the cage 8 and of the stopper and its appurtenant parts is illustrated in Figs. 15 to 18 inclusive. The screw threaded neck 2 is provided with a plurality of inwardly extending lugs 38, and adapted to rest upon said lugs is the head-plate of a cage 40, which head-plate connects the cage-arms together, and in this construction being in the form of an annulus 39. The head-plate or annulus 39 has connected thereto the depending diametrically opposed cage-arms 41, 41 said arms being connected together intermediate their ends by an annulus 42 similar to the annulus 39 or band or ring 12. The lower ends of the cage arms 41, 41 are enlarged, as at 43, 43 and have their outer sides provided with a plurality of threads 44, said threads being arranged at a slight pitch, whereby when the detachable base plate 45 is placed in engagement with said threads, and turned, the base plate will be elevated. This is accomplished by providing the base plate 45 with two upwardly extending arms 46, 46, the confronting faces of which have female threads or grooves 47 to receive the threads 44 of the arms 41, 41. In Fig. 16 of the drawings, I have illustrated a bottle or receptacle 48 within the cage 40 and in connection with said bottle or receptacle, I use a stopper of a construction which will now be described. This stopper is similar in construction to the stopper shown in Figs. 1 and 2 and its appurtenant parts heretofore described, with the exception that the central enlargement 28 of the cap-member is dispensed with. The depending screw threaded stem 6 of the lid or cap 3 is also dispensed with, and the cap-member 49 of the stopper engages the underneath face of the lid or cap 3.

The cage 40, which I will hereinafter term a circular cage, is adapted to support bottles of various sizes and contours, and by the novel construction of the cage, I find it only necessary to hold the bottle 48 at two points, namely at the bottom and at the top. To accomplish this, the cage 40 is first adjusted to accommodate the size of bottle to be used. The cage is then placed in the casing 1 with the plates or annulus 39 resting upon the lugs 38, 38 of the casing 1. The bottle or receptacle is then provided with the stopper and is placed in the cage, at which time the cap or lid 3 can be placed upon the extinguisher casing 1. In adjusting the cage, the base plate 45 thereof is positioned whereby when the stopper is placed upon the bottle 48, the cap or lid 3 will engage the top of the stopper thus binding or holding the bottle at two points within the extinguisher casing 1.

Reference will again be had to the cage 8 as supported from the depending screw threaded stem 6 of the lid or cap 3. Another form of stopper can be used in connection with the bottle or receptacle, this form of stopper being illustrated in Figs. 6 and 7 of the drawings. Assuming that the neck 37 of the bottle 10 comes within close proximity to the head plate 7 of the cage 8, a stopper 50 can be used, the stopper being similar to the stopper heretofore described in connection with Figs. 1, 2, and 16, with the exception that the top of the cap-member 26 is provided with a central recess 51. After the bottle 10 has been equipped with the stopper 50 and placed within the cage 8, the cage is rotated upon the depending screw threaded stem 6 until the lower end of the stem engages in the recess 51 of the cap-member 26, as illustrated in dotted lines in Fig. 6 of the drawings. Should the bottle 10 be considerably shorter than those illustrated, especially the neck portion thereof, the cage is further rotated until the end of the depending screw threaded stem 6 engages the recess 51 of the cap-member 26, the screw threaded stem 6 being of a sufficient length to engage the various sized bottles that may be supported within the cage. In case the depending screw threaded stem 6 is dispensed with, I use a stopper 52, (see Figs. 8–11) said stopper being similar to the stoppers shown in Figs. 1, 2, 6 and 7 with the exception of the construction of the depending arms designated 31$^a$ and 31$^b$ in Figs. 8, 9, and 10. Pivotally connected to the lower end of the arm 31$^b$, as at 53, (see Figs. 10 and 11) are two curved plates 54, 54 said plates carrying segment shaped arms 55, 55 adapted to engage in a groove 56, formed in the depending arm 31ª of the stopper 52. The plates 54, 54 are also provided with outwardly extending prongs 57, 57 by which said plates are moved. The plates 54, 54 are adapted to embrace the neck portion 37 of a bottle and retain the stopper 52 upon the bottle irrespective of the head plate 7 of the cage or the depending screw threaded stem 6 of a lid or cap 3.

In Fig. 14, I have illustrated another form of stopper, 58 wherein the closure 59 is provided with a central seat 60 for a spherical body or ball constituting the seal member. The stopper is formed with a semi-spherical recess the wall of which supports the ball 61, when the stopper is inverted as will be readily understood.

Figures 19, 20, 21, 22, 23, 24, 25, 26, 27, 28, 30:
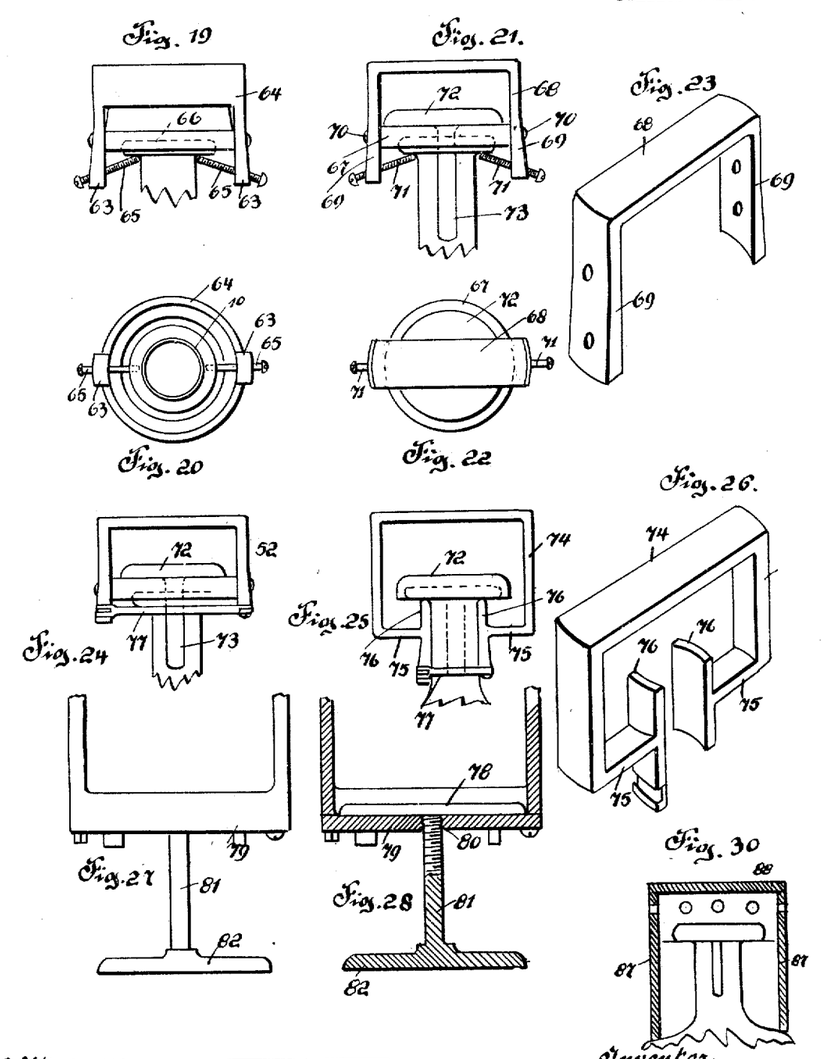
Fig. 19 is a front elevation of a modified form of stopper.
Fig. 20 is a bottom plan of the same.
Fig. 21 is a front elevation of still another modified form of stopper.
Fig. 22 is a plan of the same.
Fig. 23 is a perspective view of a strap used in connection with said stopper.
Fig. 24 is a front elevation of still another form of stopper.
Fig. 25 is still a further modification of the stopper.
Fig. 26 is a perspective view of the same.
Fig. 27 is a side elevation of an adjustable base used in connection with the cage.
Fig. 28 is a vertical sectional view of the same.
Fig. 30 is still another modified form of cap or stopper, Figs. 31 to 33 inclusive are detail views of my improved cage illustrating various shapes of bottles.

Another modification is illustrated in Figs. 19 and 20, wherein the depending arms 63, 63 of the cap-member 64 of the stopper are provided with angularly disposed adjustable screws 65, 65, said screws being used in lieu of the curved plates 54, 54 employed for retaining the stopper 52 upon the neck of a bottle. The screws 65, 65 are adapted to engage under the flange 66 of the neck of a bottle and firmly retain said stopper upon said bottle.

In Figs. 21 to 23 inclusive, a closure 67 similar to the closure 33 heretofore described is provided with a yoke 68, which in this instance constitutes the cap-member of the stopper, the depending legs 69, 69 of said yoke being secured to the closure, as at 70, 70, while the extreme ends of the legs 69, 69 are provided with screws 71, 71 similar to the screws 65, 65 heretofore described, the screws 71, 71 being employed to retain the closure 67 in engagement with the neck of a bottle. Instead of using the inverted cup 36 heretofore described (Figs. 1, 2, 6, 7, 8 to 11,), I employ a seal 72 carrying a central depending stem 73, which is adapted to engage in the neck of the bottle and assist in retaining the seal 72 upon the closure 67. In Fig. 24, I have also illustrated the seal 72 as being used in lieu of the inverted cup 36, while in Figs. 25 and 26, a still further modification is illustrated. A strap or bridge 74 having inwardly extending ends 75, 75 is employed to engage the neck of a bottle, the ends of the strap or bridge being provided with vertically disposed curved plates 76, 76 adapted to embrace the neck of a bottle beneath the flange thereof. The lower ends of the plates 76, 76 are connected together by plates 77, 77 similar to the plates 54, 54 heretofore described. In connection with the strap or bridge 74, a seal 72 is also used, the strap or bridge 74 limiting the movement of the seal and preventing it from becoming entirely disengaged. To permit of a bottle or receptacle being adjusted and held within a circular cage having a non-adjustable base or bottom, I employ means equivalent to the construction of bottle support shown in Figs. 1 and 2, and comprising a bottom 79, shown in Figs. 27 and 28. The bottom 79 of the cage is provided with a central screw threaded opening 80 in which is mounted a screw threaded rod 81 carrying upon its upper end a head 78, while its lower end is provided with an annular base 82, serving functionally as a hand wheel and as a rest for the cage when it is being supported upon a table or flat surface. The head 78 serves functionally the same purpose as the detachable base plate 45.

Figure 29:
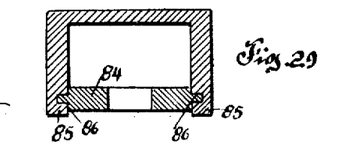
Fig. 29 is a view illustrating still another modified form of stopper.

In Fig. 29, I have illustrated a stopper, wherein a closure 84 is detachably connected to the depending arms 85, 85 of the cap-member 83 of the stopper by bayonet slot connections 86, 86, these connections being used in lieu of the screws 32.

In Fig. 30, the depending sides 87, 87 of the cap-member 88 of the stopper are adapted to rest upon the breast portion of a bottle and in connection with said stopper, I use a closure 33 and a seal 72 similar to those heretofore described. The cap-member 88 of the stopper is provided with a plurality of circumferentially arranged openings 89 through which the solution passes and commingles with the acid when the stopper is inverted. It is obvious that this type of stopper can be used with or without the stem 6 of the lid 3.

When a fire extinguisher constructed in accordance with my invention is inverted, the inverted cups 36 are adapted to drop into engagement with the cap-members of the stoppers, thus permitting of the contents of a bottle being precipitated through the closures 33, into the cups from where it commingles with the alkaline solution contained within the extinguisher casing 1. This is also true in connection with the spherical body or ball 61, and the seal 72, said ball and said seal dropping away from the closures 33, when the extinguisher casing is inverted.

Figures 31, 32, 33, 35:
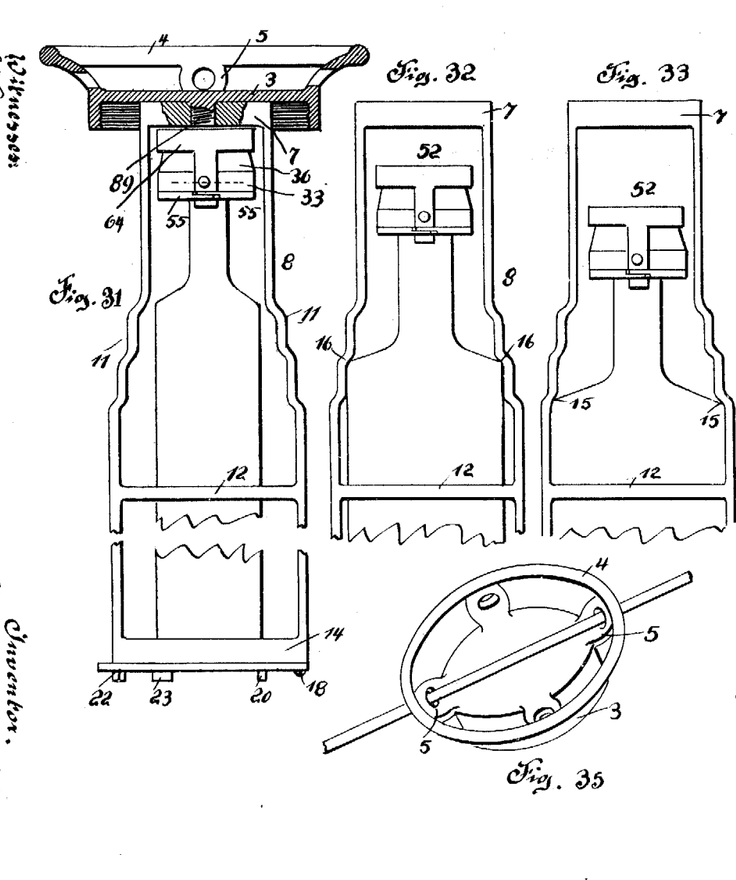
Figure 34:
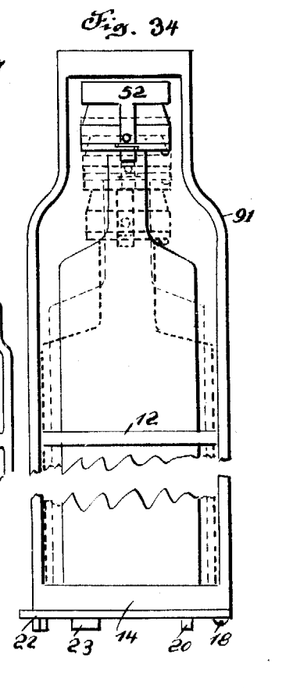
Fig. 34 is a side elevation of a circular cage illustrating various shaped bottles mounted therein.

In Figs. 31 to 34 inclusive I have illustrated the application of a stopper of the form shown in detail Figs. 8–11 to three different shapes of bottles which are supported in cages constructed in accordance with my invention. In Fig. 31 I have illustrated the cage 8 as secured to a cap or lid 3 having a short depending screw threaded stem 89', the head plate 7 of the cage being screwed up within the cap 3 and engaging said cap, somewhat similar to the cage 8 illustrated in Figs. 1 and 2 of the drawings. I have illustrated an oval bottle as being supported within the cage 8, and it will be observed that the sides of the bottle are free from the rods or cage-arm 11, 11 and that the bottle is simply held at the top and bottom thereof. In Fig. 32, a square bottle is mounted in the cage 8, the breast of the bottle engaging the shoulders 16, 16 of said cage, and in this instance, it will be observed that a short space exists between the head plate 7 of the cage and the top of the cap member 52 of the stopper. As the cap-member 52 of the stopper is provided with a central opening 90, the contents can readily pass through the stopper, when the cage and bottle are inverted. Still another shaped bottle, namely a round bottle is illustrated in Fig. 33 of the drawings, wherein the breast of the bottle engages the shoulders 15, 15 of the cage and in this instance, a greater space exists between the head plate 7 of the cage and the cap-member of the stopper than in the cage where a square bottle is used. In either of the three instances just cited, the bottles will be held stationary when the cages are inverted. In Fig. 34 of the drawings, I have illustrated a circular cage 91 in which various shapes of bottles may be loosely retained and in this connection, I desire to call particular attention to the fact that should a round or square bottle be used, it is only a matter of a short drop for the bottle, in case the circular cage is inverted, the drop not being sufficient to break the neck of the bottle or the stopper thereof. An important feature of this form of stopper, when used in connection with a bottle within a circular cage, resides in the fact that the weight of the stopper will prevent the bottle from floating in the solution when the extinguisher is inverted, thereby insuring a uniform discharge, of the acid at one point within the extinguisher. In connection with the form of stopper used in the cages illustrated in Figs. 31 to 33 inclusive, a uniform discharge is also obtained and the point of discharge depends upon the top of the bottle in connection with which the stoppers are used.

Another important feature of my invention to which I desire to call attention resides in the fact that the various shaped receptacles which may be used in connection with my improved cages can be readily held upon the top and bottom when discharging, thereby preventing the bottle from floating or becoming injured within its cage.

A particular feature to which I desire to call attention resides in the fact that the discharge point of acid can be positively maintained in one place irrespective of the length of the bottle used in connection with the casing 1. By the novel forms of adjustable cage I am enabled to position the neck portion of a bottle of considerable length in as close proximity to a stopper as a short length bottle, thus always insuring a uniform discharge of acid.

In view of the fact that my improved cage is adjustably-mounted upon a depending screw-threaded stem carried by the lid or cap of the extinguisher, the cage can be easily adjusted with relation to the lid or cap. While this construction permits of the ready adjustment of the cage, the stopper carried by the lower end of the threaded stem thereof is maintained at a fixed point with relation to the cap or lid, thereby insuring a uniform discharge of acid from all bottles mounted within the cage, irrespective of their shape. It is only necessary to rotate the cage to elevate a short bottle to engage the stopper, and, likewise, it is only necessary to lower the cage in order that a taller bottle may be placed therein and governed by the stopper carried by the depending stem of the cap or lid. The novel construction of the cage, and the cap form an important feature of my invention, and I do not care to confine myself to the use of the adjustable cage in connection with the various other elements previously described.

In practice, the various parts of my invention are constructed of strong and durable material, and while I have herein illustrated the preferred embodiments thereof I desire it to be understood that such changes, as are permissible by the appended claims, may be resorted to without departing from the spirit and scope of the invention.

What I claim and desire to secure by Letters Patent, is:—

1. A fire extinguisher comprising a cap, a depending screw-threaded stem carried thereby, a cage detachably mounted upon said stem and adapted to support a bottle and embodying a plurality of shouldered arms, recessed annuli connecting said arms, a movable base plate carried by the lower end of said arms, and a cap carried by said depending stem, adapted to engage the bottle and embodying a closure and a cup.

2. In a fire extinguisher, the combination with a lid thereof and a depending screw-threaded stem carried by the lid, of a cage detachably mounted upon the stem and embodying a plurality of shouldered curved arms, recessed annuli connecting said arms, a movable base plate carried by the lower ends of said arms and adapted to support a bottle, and a cap carried by said stem.

3. A fire extinguisher comprising a lid, a cage supported therefrom and embodying diametrically-opposed arms, a hinged base plate carried by said arms and adapted to support a bottle, a cap suspended between said arms embodying a bottle closure and a pivoted inverted cup.

4. A fire extinguisher comprising a lid, a vertically adjustable cage depending therefrom and adapted to support a bottle, a cap fitting over the mouth of the bottle, and means for adjustably connecting the cage to the lid and adapted to lock said cap in engagement with the bottle.

5. A cage for fire extinguishers comprising a plurality of arms connected together at their top and bottom, each of said arms provided with a plurality of shoulders adapted to engage the breast of acid receiving bottles of various lengths thereby maintaining the bottles from shifting within the cage when the extinguisher is inverted.

6. A cage for fire extinguishers comprising a plurality of arms connected together at their top and bottom, each of said arms provided with a plurality of shoulders adapted to engage the breast of acid receiving bottles of various lengths thereby maintaining the bottles from shifting within the cage when the extinguisher is inverted, and a recessed annuli connected to the arms.

7. In a fire extinguisher, the combination with the lid thereof and a depending screw-threaded stem carried by the lid, of a cage detachably mounted upon said stem and adapted to support a bottle, said cage consisting of a pair of shouldered and curved arms, recessed annuli connecting said arms, a hinged base plate carried by the lower end of said arm, a cap carried by said stem and adapted to engage the bottle and comprising in its construction a closure and a cup.

8. A cage for fire extinguishers comprising a plurality of arms connected together and having the upper portion thereof contracted, said contracted portion of each of the arms provided with a plurality of shoulders for the purpose set forth.

9. A fire extinguisher comprising a cap member and bottle closure connected therewith, said closure overlapping the edge of the bottle neck and provided with a bore extending entirely therethrough, and an inverted cup interposed between the closure and the cap member and resting upon the closure for shutting the upper end of the bore.

10. A fire extinguisher comprising a cap member supported from the lid of the extinguisher, a bottle closure carried by the cap member and having a centrally disposed enlargement, said closure further provided with a bore extending entirely through the enlarged portion thereof, and a cap interposed between the closure and the cap member and mounted upon the enlargement and having its edge engaging the reduced portion of the closure.

11. A fire extinguisher comprising an acid bottle closure, a cup mounted upon the closure, and a cap member pivotally connected to the closure.

12. A fire extinguisher comprising a closure for an acid bottle, an inverted cup mounted upon said closure, and a cap member pivotally connected to the closure and supported from the lid of the extinguisher.

13. A fire extinguisher comprising a closure for an acid bottle, said closure overlapping the edge of the bottle neck having a centrally disposed bore and provided with an enlargement, means mounted upon said enlargement for closing said bore, and a cap member connected to the bottle closure arranged over and adapted to receive said means.

14. A fire extinguisher comprising a cage for an acid bottle, means for closing the acid bottle, and means depending from the lid of the extinguisher casing for suspending said closure, said suspension means for the closure constituting the suspension means for the cage.

15. In a fire extinguisher, a vertically-disposed cage for an acid bottle, said cage having its upper portion provided with a plurality of shoulders for maintaining acid bottles of varying lengths from shifting.

16. A fire extinguisher comprising a casing, a lid therefor, a cage for an acid bottle, said cage provided with a plurality of shoulders at its upper end for maintaining acid bottles of varying lengths from shifting, and means for adjustably connecting the cage to the lid.

17. A fire extinguisher comprising a casing, a lid therefor, a cage for an acid bottle, means carried by the lid for adjustably connecting said cage thereto, a closure for the bottle, said means for adjustably connecting the cage to the lid constituting means for suspending the closure.

18. A fire extinguisher comprising an acid bottle-receiving cage having a hinged bottom, and an upper portion provided with a plurality of shoulders, one arranged above the other.

19. A fire extinguisher comprising an acid bottle-receiving cage having a hinged bottom and an upper portion, and recessed annuli forming a part of said cage.

20. A fire extinguisher comprising a vertically-adjustable cage having a hinged bottom and an upper portion provided with a plurality of series of shoulders, the shoulders of each series arranged above but out of alinement with each other.

21. A fire extinguisher comprising a vertically-adjustable cage having a hinged bottom and shouldered upper portion, and recessed annuli forming a part of the cage.

22. A fire extinguisher comprising a vertically-adjustable cage having a hinged bottom and an upper portion provided with a series of shoulders arranged out of alinement with respect to each other, means for adjustably connecting the cage to the lid of the extinguisher and a bottle closure suspended from the lid of the receptacle.

23. A fire extinguisher comprising a vertically-adjustable cage embodying a plurality of arms, each of said arms having its upper portion formed with a series of shoulders, the shoulders of each series arranged above but out of vertical alinement with each other.

24. A fire extinguisher comprising a cage embodying a plurality of arms, the upper portion of each of said arms formed with a series of shoulders, the shoulders of each series arranged above each other but out of vertical alinement.

In testimony whereof I affix my signature in the presence of two witnesses.

THOMAS F. HANDLY.

Witnesses:
E. E. POTTER,
H. C. EVERT.